United States Patent Office 3,283,115
Patented Nov. 1, 1966

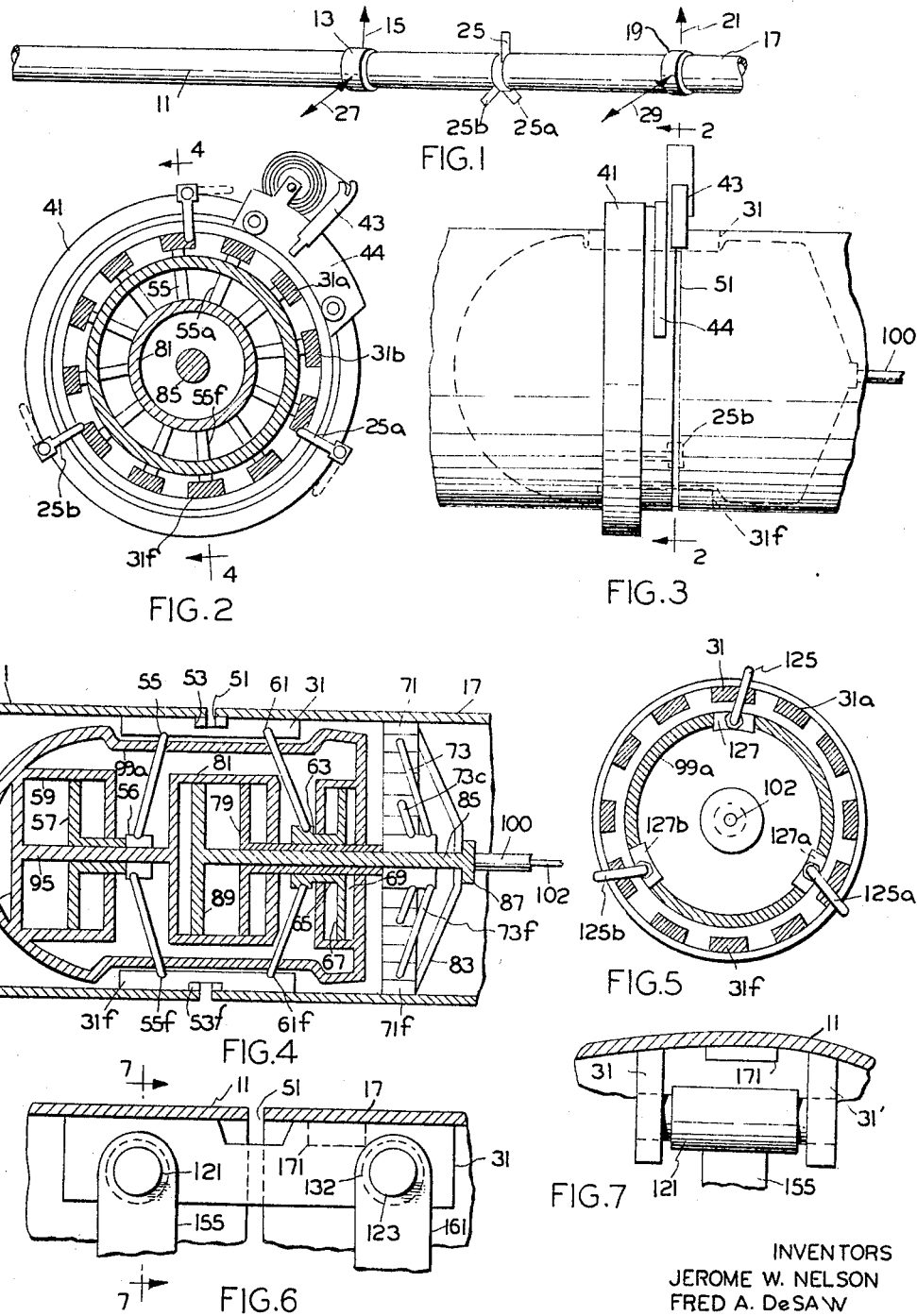

3,283,115
STRONG-BACK CLAMPING SYSTEM FOR HOLDING PIPE JOINTS DURING WELDING
Jerome W. Nelson and Fred A. De Saw, Columbus, Ohio, assignors, by mesne assignments, to Esso Research and Engineering Company, Elizabeth, N.J., a corporation of Delaware
Filed Dec. 31, 1964, Ser. No. 422,625
3 Claims. (Cl. 219—60)

The present invention relates to an improved strong-back clamping system for holding pipe joints during welding. It is particularly adapted for the holding of lengths of large and heavy pipe together during electric arc welding operations such as are commonly practiced in the construction of pipelines for oil and gas, etc. The invention has a special application to large pipes, e.g. pipes of six inches or more in diameter. It is particularly applicable to the larger pipelines such as those sixteen inches or more in diameter where welding is normally a very expensive operation.

In the construction of pipelines it is common practice to bring two lengths of pipe into the juxtaposed position desired for welding and to hold them in such position by some mechanical means while the welding operation is carried out. In the past, most welding operations of this type have been accomplished manually and there has usually been nothing particularly critical about the way in which the joint was held. As long as the clamping apparatus was adequate to hold the adjoining pipe ends in reasonable alignment there usually have been no problems.

Recently, however, there has been developed an automatic process for the welding of pipelines in situ in the field. This automatic system is a precision operation. It involves the use of an electric arc welding machine which rotates the arc about the joint between the pipe ends. In particular, it requires that the joint be very carefully aligned. Alignment and spacing must both be properly maintained in order that a good joint may be produced by the automatic mechanism. While the present clamps are applicable to various systems of welding, they are particularly suitable for that type of welding that is described, for example, in U.S. Patent Nos. 3,084,224 and 3,084,226.

The automatic welding systems such as those just described involve the formation of a carefully spaced gap between adjacent pipe ends. The pipe ends must be formed perpendicular, i.e., they lie in parallel planes, so that the welding space between the pipe ends will be uniform. A typical gap has a width of about 0.050 to 0.070 inch and its depth is, of course, equal to the thickness of the pipe wall. Such a gap may be made by first bringing the pipe ends close together, either in complete abutment or nearly so and then using a cutting device of the proper thickness to cut out the gap or parallel walled space around the joint. Such an operation, as described in the aforesaid patents, is preparatory to welding by means of a consumable thin wire-electrode. This welding usually is done under gas shielded conditions.

Alternatively, where the pipe ends are formed with sufficient precision, being plane and also perpendicular to the axis of the pipe, it is often possible, with equipment of the present invention, to bring the pipe sections together to the desired spacing and in proper alignment and hold them there while the welding is performed. This avoids the necessity of any cutting operation. It is a preferred procedure where the aligning and holding equipment is complicated. When pipes can be aligned with sufficient precision and when their end surfaces are formed in true planes, then the automatic procedure can produce the right type of weld without difficulty. The present invention has as a primary object to devise a clamping pipe means which will hold the pipe sections in the desired relationship for either of the types of welding procedures just described.

Thus, in the preferred welding procedure, pipe ends are brought together with their end surfaces in parallel planes and the proper spacing is either formed by mechanical cutting, grinding, etc., or where the pipe surfaces have been formed with sufficient accuracy in the first place, the desired welding gap is obtained by moving the pipes to the desired spaced condition and holding them firmly there. This holding must be sufficiently firm to resist the normal expansion and contraction forces which arise due to the heating and subsequent cooling incident to the welding operation. That is to say, that there are strong forces exerted in one direction or another as heat is applied to the pipe wall to effect welding and also as the heated parts cool differentially. Since the welding joint is not formed all at once, but is formed progressively around the circumference of the pipe, this heating and cooling produces unequal forces which shift around the pipe line as welding proceeds and tend to cause mis-alignment. Shrinkage in cooling particularly, has a tendency to close the gap, or to cause uneven spacing around the joint. Such conditions are detrimental and tend to prevent obtaining of a good sound weld. The clamping device of the present invention has as a further object, the holding of properly aligned pipe joints against such forces, powerful though they are.

A still further object of the present invention is to incorporate in the clamping mechanism itself, a means for moving the pipe elements into proper juxtaposed position. By these means the pipe sections may be spaced to provide a desired gap or held in firm abutment end-to-end. Mechanism for causing such movement is preferably included within the clamping structure and forms an operating part thereof. Alternatively in some cases, however, moving mechanism may be omitted or its use may be optional.

The invention makes special use of "strong-back" members which bridge the gap in such a manner as to apply the required pressures to permit welding to proceed. They are designed to take hold of the pipe ends sequentially and then to hold without relaxing the grip of the clamping device on both pipe elements. Previous clamping mechanisms have had means for clamping respectively one joint or the other, releasing one ahead of the other if desired. The present invention includes such elements also, but they are so designed as to accomplish the holding purposes previously described in a novel manner.

The invention also contemplates the use, and is adapted for use with, spacing or gaging devices which may be mounted on and operated from the clamp mechanism itself or they may be external to the clamping means and separately operated. These gaging or spacing devices, preferably three in number, are preferably situated so as to determine the proper plane and spacing for the end surface of the new pipe length which is brought into position against the installed section of pipeline. As the pipeline is being built, the new section having plane ends, which are perpendicular more or less to the pipe axis, is brought into a position with its end surface in accurate parallelism with the end of the installed section. In some cases the plane end surface may not be perpendicular to the pipe axis, or the pipe may be bent or curved, inadvertently or purposely. With the present invention it does not matter whether the plane of the pipe end is precisely perpendicular to the axis of the pipe or not. If there is a slight departure from perpendicularity the apparatus nevertheless will make a proper joint. The misalignment of the axis of the new section with that of the old is quite immaterial as long as the abutting pipe ends are truly planar and as long as they can be brought into parallelism and held there.

The invention will be more fully understood by reference to the embodiments thereof which are illustrated in the attached drawing and described in detail hereinafter. Referring to the drawings:

FIG. 1 is a small scale drawing of a pipeline showing the general scheme for obtaining proper relative positions between a new joint to be installed and the existing or installed section.

FIG. 2 is a transverse sectional view taken substantially on the line 2—2 of FIG. 3. It also represents a much enlarged section at the joint shown in FIG. 1.

FIG. 3 is a fragmentary and enlarged portion of a pipeline near the joint between two sections of pipe, showing a typical automatic welding system in outline and indicating its relative position with respect to the clamping device which constitutes the present invention. The latter is shown in outline in dotted lines in this figure.

FIG. 4 is a longitudinal sectional view taken more or less along the axis of the pipeline and along the lines 4—4 of FIG. 2 illustrating the internal mechanism of the clamping device of the present invention.

FIG. 5 is a transverse sectional view of a modified clamp, generally similar to FIG. 2.

FIG. 6 is an enlarged fragmentary detail view of a preferred "strong-back" clamping element.

FIG. 7 is a transverse sectional view taken approximately along the line 7—7 of FIG. 6.

Referring in detail to the drawings, FIG. 1 illustrates an installed portion or section 11 of a pipeline to which additional lengths of pipe are to be added. This pipeline is supported by a lifting device, not shown, but which includes a strap or the like 13 around the pipeline and a lifting element indicated graphically by the arrow 15. This holds the end of the installed pipe off the ground at a suitable distance to permit welding operations completely around and particularly under the bottom of the pipe.

At the right a new section 17 of pipe is shown as being brought into position, being lifted by suitable means including a band 19 supported by a lifting force 21. The lifting means 15 and 21 in both cases may be appropriate mechanical hoist means such as tractor mounted cranes, or the like, as are commonly used in pipeline construction.

A set of three feeler gauges 25, 25a, and 25b are used between the adjacent and abutting pipe end surfaces to space them slightly apart when they are brought into juxtaposed position. These feeler gauges are so constructed as to withstand impact of the pipes being brought together and they may also include elements adapted to "feel" the pressure between the pipe ends and to actuate electrically controlled mechanism by which the hoisting mechanisms 15 or 21 or both may be controlled to maintain proper vertical alignment. It will be understood that lateral forces in the form of pushing or pulling means, indicated at 27 and 29 respectively, may also be applied to the pipeline to maintain proper alignment in a horizontal plane between the installed section and the new section. The feeler gauges may be used to control appropriate devices to establish and maintain alignment in all directions, lateral as well as vertical.

Referring next to FIG. 2, the end section of pipe 11 is shown as an annular member within which are clamping elements 31, 31a, 31b, etc. A number of these elements surround the periphery of the pipe internally, their number being sufficient to firmly hold the pipe under all foreseeable conditions of stress and strain incident to holding the weight of the pipe sections and resisting the forces due to the thermal effects of welding. These clamping elements 31, 31a, etc., are each in the form of a rigid bar of strong metal, preferably steel. They also may have knurled exterior surfaces so as to exert a good grip on the internal surface of the pipe. Two of these elements are shown in dotted lines at 31, and 31f, respectively, FIG. 3.

As shown in FIGS. 2 and 3, a welding device in the form of an annular frame member 41 surrounds the pipeline and includes a welding head 43 adapted to rotate or travel around the pipe during the welding operation. A carriage 44 supports the head 43 and is guided in its orbital movement by member 41. This member 41 also supports the feeler gauges 25, 25a, and 25b, which, as seen in FIG. 2, may be shifted and rotated into or out of feeler position as needed.

Referring to FIG. 4, there is shown a longitudinal section of clamp inside the pipeline at and near the joint. It will be noted that the original pipeline section 11 and the new section 17 are slightly spaced to leave a gap 51. This gap may be either formed by accurate spacing between the pipe ends or it may be formed by cutting after the pipes have been clamped in position with a narrower gap or no gap, as explained in the patents mentioned above. In any case, prior to welding, the gap of optimum and uniform width is properly established and formed. It may be formed by cutting with a suitable abrasive disc or thin milling cutter just ahead of the welding operation. However formed it must be maintained at a very uniform width around the whole pipe periphery to accomplish the advantageous results of the automatic procedure described above and explained in greater detail in the above mentioned patents.

The clamping device itself consists of the series of strong-back clamping elements 31, 31a, 31b, etc., as seen in FIG. 2, only two of these, 31 and 31f, being visible in FIG. 4. See also FIG. 3. These elements are made to bridge the gap and to hold both sections of pipe with powerful forces. They are notched on their outer surfaces opposite the gap between the pipe ends, as indicated at 53, and 53f, FIG. 4, so that the welding procedure and, if desired, a cutting procedure, ahead of the welding may be carried out around the periphery of the pipe while the clamping is maintained. The bars 31, 31f, etc., are still sufficiently strong, however, that once both ends of the bars are put under pressure there can be no relative movement between pipe sections 11 and 17.

The left ends of clamping elements 31 as seen in FIG. 6, are forced into clamping position by toggle elements 55, 55a, etc., including 55f. These toggle elements 55, etc., are operated from a sliding hub member 56 actuated by a hydraulic piston 57 in a cylinder 59. The piston is movable in either direction in the cylinder and is actuated by a supply of hydraulic fluid controlled by conventional valves and a pump from a supply not shown. In similar fashion, at their right ends, as seen at FIG. 4, the clamping elements 31, etc., are forced into clamping position by toggle elements 61, 61a, etc., including 61f. The latter are moved into position by their connection to a hub member 63 on a hollow, slidable shaft 65 attached to hydraulic piston 67 in hydraulic cylinder 69. As in the case of piston 57, hydraulic force can be applied to either side of the piston to apply a clamping force to the bars 61 or to remove such clamping force.

The elements so far described constitute the main clamping mechanism and in cases where it is not necessary to provide a precise and firm spacing by mechanical means between the pipe ends, the other elements shown in FIG. 4 are not absolutely necessary. Preferably, however, means are provided for getting an additional grip on the new pipe section and pulling it into position against the feeler gauges 25, 25a, etc. For this purpose, a set of expandable clamping and holding shoes 71, 71a, etc., including 71f, etc., are provided farther to the right, as seen in FIG. 4. These are actuated by toggle elements 73, 73a, etc., including 73f, which are connected to the hub member of a slidable hollow shaft 77. The latter is connected to piston 79 in a cylinder 81, the arrangement being such that movement of piston 79 to the left, as seen in FIG. 4, applies a gripping force to the shoes 71, 71a, etc. Once these shoes have been tightly engaged with the internal surface of the pipe, it is possible to apply a leftward force to the shoes, and this is done by means of a spider or conical disc member 83 mounted on a slidable shaft 85 having a head 87 which engages the disc. This shaft is connected with a piston 89 inside of cylinder 81. The arrangement is such that hydraulic fluid can be admitted to one side or both sides of piston 89, as well as to one or both sides of piston 79. In operation, valve mechanism not shown, but of obvious type to those skilled in the art, is operated to apply first a clamping pressure to the shoes 71. Thereafter, pressure is relieved on the left side of piston 89, whereas hydraulic fluid is forced into the space between pistons 79 and 89 to cause the shaft 85 to move to the left and pull the pipe into position. Any tendency to relax the clamping mechanism is opposed by pressure on the right side of piston 79, which may be sufficiently high to insure that the shoes 71 will not be relieved from their gripping action while the pipe is being shifted to the left. With feeler gauges 25, etc., in the gap 51, it is obvious that the pipe can be drawn up tightly against the gauges. Thereafter the heavy strong-back clamp elements 31, 31a, etc., can be tightly engaged at both ends to hold the pipe elements against further relative movement.

In operation of the clamping device just described the clamping elements 31 are positioned inside the pipeline with their notches 53, etc., opposite the intended welding gap. Thereupon piston 57 is actuated to apply a moderate holding force to the left ends of bars 55 inside pipe section 17. The latter are preferably attached to the bars 31, etc., and also to the hub 56 of the hollow shaft 58, which connects to piston 57. A shaft 95 connects the base 97 of cylinder 59 to the cylinder 81 so as to maintain proper alignment between the parts. Base 97 is secured to the curved or ogive end of the clamp 99. The latter permits easy insertion and guiding of the clamp into the pipe at its opposite end. The cone shaped disc or spider 83 performs a similar guiding function as the new pipe is slid onto the clamp. As is well known in the art, a suitable control handle 100 extends clear through the new pipe section so that the device can be pulled along within the pipe from joint to joint as new pipe sections are added. Supporting rollers, not shown, are conventionally provided on the clamp device to support its weight and assist in transporting it through the pipe as new pipe sections are added to the line.

Referring to FIG. 5, the arrangement of the clamp is generally the same as in FIGS. 2 and 4, except that the gauging devices 125, 125a, and 125b, have been mounted inside the clamping device. This may be done by providing appropriate openings and brackets 127, 127a, and 127b in the shell 99 at its midsection 99a in appropriate position for the gauges to turn outwardly, as shown in FIG. 5, to engage the gap between the pipe sections.

In other respects the clamping device of FIG. 5 is much like that of FIG. 4. It rests inside the pipe 11 and has the expanding mechanism to bring the clamping elements 31, 31a, 31b, etc., into engagement with the interior surface of the pipe. The gauges may be operated manually by turning them out to gauging position before the new pipe section 17 is brought into place, or they may be operated by electrical or pneumatic controls from within the clamping mechanism itself, e.g., through control of a Bowden wire passing along the handle 100, as indicated at 102, FIG. 5. Prior to welding they must be moved out of the gap.

In the embodiments so far described, the connections between the actuating toggle elements 55, 61 and the clamping shoes 31 have not been described in detail. These connections can assume various forms, but the preferred arrangements are as shown in FIGS. 6 and 7. Referring to FIG. 6, the pipe sections 11 and 17 are shown with a gap 51 between them just as in FIG. 4. Here the strong-back clamping elements 31, 31a, etc., are provided, preferably in pairs 31 and 31'. Between these pairs at their left end is a strong bar or shaft 121 on which is pivotally mounted the actuator bar 155 which is essentially the same in design and function as bars 55 in FIG. 4. At their right ends, the strong-back bars 31 and 31' are similarly actuated. Here the cross bars or shafts 123 are similar to bars 121 and are similarly connected to the actuator elements 161 similar to elements 61 in FIG. 4. The opening 132, which receives bar 123, is shown as being elongated slightly. The purpose for this is to permit some relative movement with respect to the length of bar 31 between the actuating elements 155 and 161. With this arrangement it is possible to engage the internal surface of the new pipe section 17 with a light secondary clamping member shown in FIG. 7 and in dotted lines in FIG. 6. This secondary clamp takes hold of the pipe with sufficient force to permit pulling the pipe 17 to the left and up against feeler gauges in gap 51. Thereafter, application of full force to the toggle bar 161 brings the main clamping elements 31, 31' into full clamping engagement with the inside surface of the pipe.

In this way, the function of the added clamping units 71, 71a, etc., FIG. 2, may be incorporated into the main clamping structure itself, in which case the conical disc or spider 83 may be brought into engagement with the bars 161. By reason of the initial light clamping engagement of the shoe elements 130, while the main bars 31 are not tightly engaged inside the pipe section 17, the latter may be dragged to the right. Thereafter, the full clamping action prevents further relative movement between the pipe sections.

It is to be emphasized that the problem of holding a joint with an even and uniform gap width 51 is a difficult one and strong forces are involved. The weight of a section of pipe 17, in the case of large pipes particularly, is very great and even the strongest clamping action may not hold the parts with sufficient force to prevent a change in the width of the gap, especially if the full weight of the pipe is taken by the clamp. For this reason it is preferable to have a lifting force on the pipe. However, the clamp is sufficiently strong that variations in the lifting force, if it is reasonably related to the pipe weight, are not likely to cause any slippage and misalignment at the joint. The device of FIG. 4 could, of course, be made strong enough to apply any desired internal force to the pipe, but the strength of the pipe is a limiting factor. Forces might be applied strong enough to burst the pipe and still not be strong enough to prevent slippage or misalignment under extreme conditions. This is particularly true of heavy pipes that are not adequately supported. The main purpose of the clamping device is not to sustain the weight of the pipe but to make sure that once the pipe sections are properly aligned, this alignment will be maintained.

It will be obvious that various changes may be made in the several elements of the mechanism without departing from the spirit of the invention. If desired, the two end parts of the clamping bars 31, 31a, etc., may be made separate, with a connecting link between them providing for relative pivotal movement. For example, when the left end is engaged inside pipe 11, the other may be withdrawn more fully if it is hinged or connected to the left end part by pivoted links. The only difficulty with this is that no play of lost motion can be tolerated in the pivotal connection. Subject to this limitation, it is possible to connect the two parts together by suitable link mechanism. When he bars 31, etc., are made unitary, as is preferred, they should have enough resilience or elasticity that the left end can be engaged with a suitable holding force within the pipe section 11 while the right end is contracted slightly, just enough to permit the pipe section 17 to slide into approximate abutting position over the shoes 31, 31a, etc. Thereupon both ends are brought radially outward into full clamping relation with the pipe. As previously indicated, it may be desirable to have these clamp elements surfaced with serrated or knurled surfaces which grip the pipe effectively. Internal marring of the pipe, however, is not usually desirable or permissible.

It will be understood that, in the prior art, clamping devices have been designed which have separate clamping shoes for the installed section and the new pipe section. The main difficulty with these is that they do not hold the parts with sufficient rigidity for purposes of the present invention. This invention is designed for use in connection with the accurate high speed, narrow gap type of welding described above. It will be obvious that various changes and modifications will suggest themselves to those skilled in the art, within the spirit of the invention, and it is intended by the claims which follow to cover such, as far as the prior art properly permits.

What is claimed is:

1. An internal clamping means for holding the ends of adjacent pipe sections in precise alignment for girth welding, comprising, in combination; a plurality of individual radially distributed elongated clamping elements extending longitudinally of the pipe sections, each of said clamping elements having opposite ends arranged to selectably engage the internal surfaces of adjacent pipe sections, and a central outwardly facing relieved portion; first motor means for expanding one end of all of said clamping elements into contact with one of said pipe sections, second motor means for expanding the opposite ends of all of said clamping elements independently of the first ends into contact with the other of said pipe sections, a plurality of holding shoes, third motor means for expanding said shoes into internal contact with one of said pipe sections, a disc member, and fourth motor means connected to said disc member cooperative with said third motor means for longitudinally moving said disc member into contact with said holding shoes to thereby move one of said pipe sections into predetermined relationship with the adjacent pipe section prior to expansion of the opposite ends of said clamping elements into contact with said adjacent pipe section.

2. The combination of claim 1 including feeler gage means for establishing a predetermined spacing between the ends of said adjacent pipe sections.

3. The combination of claim 2 wherein each of said motor means includes a hydraulically operated cylindrical piston element, each said piston element having a common axis of symmetry and line of movement longitudinally of said pipe sections.

References Cited by the Examiner

UNITED STATES PATENTS

| | | | |
|---|---|---|---|
| 1,696,455 | 12/1928 | Rupley | 219—60 |
| 1,877,767 | 9/1932 | Koch | 219—60 |

FOREIGN PATENTS 1,123,062  2/1962  Germany.

RICHARD M. WOOD, *Primary Examiner.*